United States Patent Office 3,162,647
Patented Dec. 22, 1964

3,162,647
4,5-DIALKENYLOXY-2-IMIDAZOLIDINONES AND METHOD OF PREPARING SAME
Takenari Nakagome, Nishinomiya-shi, Junki Katsube, Abeno-ku, Osaka, and Takashi Seki and Syunzi Aono, Toyonaka-shi, Japan, assignors to Sumitomo Chemical Company, Ltd., Osaka, Japan, a corporation of Japan
No Drawing. Filed July 16, 1962, Ser. No. 210,132
9 Claims. (Cl. 260—309.7)

This invention relates to 4,5-dialkenyloxy-2-imidazolidinones represented by the general formula

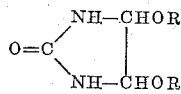

wherein R means alkenyl radical, to a method of preparing the same, and to a pharmacologically active composition containing the same.

A series of compounds obtained here are new substances which have never been disclosed in any printed articles and they are very valuable because of their useful pharmacological activity found by us.

Heretofore, 4,5-dialkoxy-2-imidazolidinones were synthesized by condensation reaction of 4,5-dihydroxy-2-imidazolidinone with a saturated aliphatic alcohol in an aqueous inorganic or organic acid solution (see British Patent No. 779,849). If an unsaturated aliphatic alcohol was used instead of the saturated aliphatic alcohol, it was found that the yield of 4,5-dialkenyloxy-2-imidazolidinone was exceedingly low. While, the method of the present invention permits the obtainment of 4,5-dialkenyloxy-2-imidazolidinone, as well as 4,5-dialkyl-2-imidazolidinone, in high yield and with high purity.

Thus, an object of the invention is to provide a series of novel compounds which are useful as medicament, especially as depressant of central nervous system. Another object is to provide a method of preparing such compounds with technical and economical advantages. Still another object is to provide a pharmacologically active composition containing such compound, which can be used as depressant of central nervous system. Other objects would be apparent from the following description.

The compounds of the present invention, 4,5-dialkenyloxy-2 imidazolidinones, can be represented by the general formula

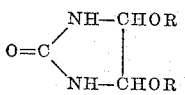

wherein R means alkenyl radical.

The present invention is also concerned with a method of preparing 4,5-dialkenyloxy-2-imidazolidinone which comprises heating 4,5-dihydroxy-2-imidazolidinone with an unsaturated aliphatic alcohol in the presence of a solid dehydrating agent to cause condensation with splitting off of water.

The reaction which takes place herein is represented by the following formula:

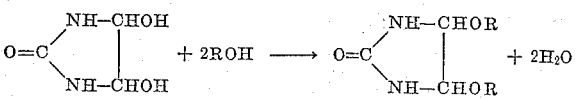

In the above reaction, it is not always necessary to use a solvent, but it is preferable to add some solvent to secure smooth progress of the reaction. Suitable solvent is unsaturated aliphatic alcohol per se which is the starting material of the invention. Usually such unsaturated aliphatic alcohol may be used in an amount of 2 to 10 moles, preferably about 5 moles, per mole of 4,5-dihydroxy-2-imidazolidinone. Other suitable organic solvents involve various liquid aliphatic and aromatic hydrocarbon, such as pentane, hexane, heptane, cyclohexane, benzene, toluene, etc., acetone, chloroform, dimethylformamide, dimethylacetamide, and the like. Together with the above-mentioned alcohol solvent, such organic solvent can be jointly used, if desired, without troubles against the intended reaction, and such joint use is rather preferable becaues it usually makes isolation and separation of the product easier. Of course, the solvent used should be anhydrous.

Unsaturated aliphatic alcohols which are suitable for the purpose of the invention are of various kinds, particularly of carbon number of 3 to 6, including allyl alcohol, crotyl alcohol, 3-butene-1-ol, 4-pentent-1-ol, 3-pentene-1-ol, 4-pentene-2-ol, 4-hexene-1-ol, 4-hexene-2-ol and the like.

Suitable solid dehydrating agents are zinc chloride, anhydrous copper sulfate, anhydrous calcium sulfate, anhydrous magnesium sulfate and the like. Zinc chloride is particularly recommendable. The amount of the solid dehydrating agent to be used may vary depending on their dehydrating activity, and generally it may be 1–2 moles per mole of 4,5-dihydroxy-2-imidazolidinone.

Suitable reaction temperature may be within the range of from 0° C. to the boiling point of the starting alcohol or reaction solvent used.

Reaction period may vary depending on the type of the solid dehydrating agent and that of the starting aliphatic alcohol, and progress of the reaction can be brought to notice by conversion of a white suspension of 4,5-dihydroxy-2-imidazolidinone and the aliphatic alcohol into a clear solution.

These compounds which are obtained in accordance with the present invention generally are colorless, crystalline solid, and are soluble in organic solvents and sparingly soluble in water.

The compounds are useful as mild, long-lasting sedatives because of their activity to depress central nervous system, with low toxicity. Such compounds of the general formula wherein R is $CH_2=CH \cdot CH_2-$,

$CH_3-CH=CH-(CH_2)_3-$ or $CH_3-CH=CH-(CH_2)_2-$ show mild sedative action and those where R is $CH_3-CH=CH-CH_2-$,

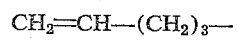
$CH_2=CH-(CH_2)_3-$ or $CH_2=CH-(CH_2)_2-$ show remarkable hypnotic action besides the sedative action. Thus the compounds of the general formula are valuable as long-lasting sedatives, tranquilizer, hypnotics anticonvulsant, with less toxicity to mammals.

Effectiveness of the compounds of the present invention will be mentioned below with reference to the experimental results.

4,5-dicrotyloxy-2-imidazolidinone (compound I) and 4,5-di(4'-pentenoxy)-2-imidazolidinone (compound II) when orally administered to mice show $LD_{50}$ value of 1700 mg./kg. and 740 mg./kg., respectively. These compounds also show $HD_{50}$ (hypnotic dose) value of 370 mg./kg. and 239 mg./kg., respectively. Sedative effect of these compounds is rather lasting, for instance, the compound (I) of 750 mg./kg. and that (II) of 350 mg./kg. allows to maintain 50% of tested animals in sleeping conditions over a period of about 90 minutes and of about 150 minutes, respectively. To show excellency of these compounds, comparisons are made with the conventionally known sedatives. For example, methylparafynol when subcutaneously administered at the dose of 500 mg./kg. to mice can show sleeping action which lasts over about one and a half hours, but the dose of 800 mg./kg. of the same compound causes to have about a half of tested mice died and the dose of 1250 mg./kg. causes fatal death of whole tested animals. Ethinamate when orally administered to mice can show sleeping activity at the dose of 145 mg./kg., but it causes to have about a half of tested animals died at the dose of 650 mg./kg. Thalidomide administered orally or intraperitoneally to mice at the dose of 1,000 mg./kg. does not provide sleeping condition for the mice but shows sedative effect only.

The intraperitoneal administration of the compounds (I) or (II) to rats is effective at the dose of 50 mg./kg. to cause sedative conditions. The compounds (I) and (II) administered at the dose of 200 mg./kg. and 100 mg./kg. respectively cause sleeping conditions over four hours. When rats are intraperitoneally administered with meprobamate at the dose of 200 mg./kg., they show loss of righting reflex over about three hours, and accordingly it is considered that the compound (II) of the present invention is twice as potent as, and compound (I) is almost the same as that of meprobamate. Ethinamate which causes sedative condition and sleeping condition at the dose of 25 mg./kg. and of 100–150 mg./kg. respectively can show shorter duration of action which disappears about two hours later.

About twenty minutes after the oral administration of the compound (I) or (II) at the dose of 25 mg./kg. to cats, remarkable sedative effects are obtained, accompanying decreased sensitivity against external stimulation and reduction of spontaneous motor activity. Tested animals administered with the same compound of 75–100 mg./kg. are completely brought into fully sleeping condition when they are allowed to remain still. The animals arise from sleeping condition by hand touching or other external stimulation, and so they are considered as being in substantially physiological sleeping condition. At the dose of 25 mg./kg., ethinamate shows sedative effect which lasts for 6 hours and at the dose of 50 mg./kg., it shows sleeping effect which lasts for 7 hours. Such fact means that the compounds (I) and (II) are as effective as ethinamate. Thalidomide which is administered orally or intraperitoneally at the dose of 50 mg./kg. shows sedative effect which lasts only 2–4 hours.

The compounds of the present invention markedly potentiates hypnotic effect of hexabarbital. For instance, where the compound (I) or (II) is subcutaneously injected to mice at the dose of 100 mg./kg. and then 15 minutes later, the minimum hypnotic dose of hexabarbital is intraperitoneally injected, prolongation of sleeping period by 275 or 634% is obtained. In the similar experiments, ethinamate prolongs a sleeping period by 300%, and this means that the compound (II) is more effective than and the compound (I) is almost the same as, ethinamate. For additional information, thalidomide of 100 mg./kg. extend the sleeping period by about 200%.

Anti-convulsant activity of the compounds of the invention is remarkable. In our tests, mice are intraperitoneally administered with the compound (I) or (II) and then, 15 minutes later, intraperitoneally injected with pentetrazol at the dose of 125 mg./kg. that is the $LD_{100}$ value. The amount required to prevent the death for less than 50% of mice is 82 mg./kg. of the compound (I) and 47 mg./kg. of the compound (II). In the similar experiments, methyl-parafynol is to be used in the amount of about one-fifth of $LD_{50}$, and this means that the compounds of the present invention are twice as effective as methyl-parafynol. The compounds (I) and (II) also show excellent anti-convulsant activity against the action of strychnine. The amounts of these compounds (I) and (II) required to prevent the death for 50% of mice or lower due to the action of strychnine are about 250 mg./kg. and 200 mg./kg.

The compounds of the present invention show some effect on the EEG (electro-encephalogram) of the cats. For instance, where 50 mg./kg. of compound (II) is injected intraperitoneally to the cats in which the spinal cord was dissected at C–1 to C–2 and then about 15 minutes later the sleeping pattern is observed on the spontaneous EEG of cortex, thalamus and hippocampus. This effect lasts 4 hours. At the dose of 100 mg./kg. further slowing of the frequency and decrease of voltage of cortical EEG are occurred. At the dose of 100 mg./kg., thalidomide shows an increase of slow wave, a spindle formation on cortical EEG and this means that compound (II) is as effective as or somewhat potent than thalidomide.

The compounds of the present invention depress the EEG arousal response which is evoked by the high frequency stimulation of the midbrain reticular formation. For example, after intraperitoneal administration of 50 mg./kg. of compound (II) the after-effect is diminished 15 minutes later, and the reduction of the threshold is observed by 2 hours. Since in some case thalidomide does not show any depressive effect on the EEG arousal response even at the dose of 50 mg./kg., compound (II) is more effective than thalidomide.

The compounds of the invention depress the recruiting response obtained by low frequency stimulation of n. centralis medialis. For example, after intraperitoneal injection of 100 mg./kg. of compound (II), 80% of increase of threshold is observed within 4 hours. Thalidomide in dose ranging from 50 mg./kg. to 500 mg./kg. has no effect on this response. This means that compound (II) is more effective than thalidomide.

Hypnotic effects of other compounds than compounds (I) and (II) are as follows.

TABLE

Compound (III) : 4,5-diallyloxy-2-imidazolidinone
Compound (IV) : 4,5-di(4-hexenyloxy)-2-imidazolidinone
Compound (V) : 4,5-di(3-butenyloxy)-2-imidazolidinone
Compound (VI) : 4,5-di(3-pentenyloxy)-2-imidazolidinone

HYPNOTIC EFFECTS OF 4,5-DIALKENYLOXY-2-IMIDAZOLIDINONE DERIVATIVES ON MICE

| HD 50 (mg./kg.) | (III) | (IV) | (V) | (VI) |
|---|---|---|---|---|
| Sc | 820 | >2,500 | | |
| Po | 1,420 | ca 2,500 | 580 | 1,000–1,500 |
| Ip | 660 | 1,180 | | |

In comparison with the effects of 4,5-dialkyloxy-2-imidazolidinone, it is obvious that the unsaturated derivatives are more effective hypnotics than the saturated derivatives. For example, 4,5-dibutoxy-2-imidazolidinone which is one of the most effective compounds in the saturated derivatives, when orally administered to mice, shows the $HD_{50}$ of 520 mg./kg. This effect is not so potent as that of compound (I) or (II).

Now the present invention will be mentioned in detail with reference to the following examples, which are, however, set forth merely by way of illustration and not by way of limitation.

*Example 1*

59.1 g. (0.5 mole) of 4,5-dihydroxy-2-imidazolidinone, 145.2 g. (2.5 mole) of allyl alcohol and 136.3 g. (1.0 mole) of zinc chloride in 200 cc. of chloroform are warmed at 55–60° C. After a short while, the reaction mixture becomes a clear solution. By maintaining that temperature, with stirring, for another period of 10 minutes, reaction is completed. After cooling, the resulting reaction mixture is washed with water and then the solvent is removed by distillation under a reduced pressure. 54.0 g. of 4,5-diallyloxy-2-imidazolidinone is obtained. Yield 54.5% of theoretical. This compound starts to sinter at 55° C. and melts at 61° C.

Elementary analysis:

| | C | H | N |
|---|---|---|---|
| Found | 54.26 | 7.15 | 14.35 |
| Calcd. (for $C_9H_{14}O_3N_2$) | 54.46 | 7.12 | 14.13 |

Example 2

23.6 g. (0.2 mole) of 4,5-dihydroxy-2-imidazolidinone are suspended in a liquid mixture of 72.1 g. (1.0 mole) of crotyl alcohol and 30 cc. of chloroform. To the suspension, 54.6 g. (0.4 mole) of zinc chloride is added, and the mixture is heated on a water bath to have an interior temperature of 60–65° C. After a short while, the resulting reaction mixture becomes a deep green-colored clear solution. By maintaining that temperature, with stirring, for an additional period of 25 minutes, reaction is completed. The reaction mixture is mixed with 400 cc. of chloroform and subsequently washed with water and then distilled under a reduced pressure to remove the solvent. By recrystallizing the residue from acetone, 33.4 g. of 4,5-dicrotyloxy-2-imidazolidinone is obtained. Yield 74.0% of theoretical. This compound has M.P. 117–119° C.

Elementary analysis:

|  | C | H | N |
|---|---|---|---|
| Found | 58.57 | 8.11 | 12.13 |
| Calcd. (for $C_{11}H_{18}O_3N_2$) | 58.39 | 8.02 | 12.38 |

Example 3

23.6 g. (0.2 mole) of 4,5-dihydroxy-2-imidazolidinone, 86.1 g. (1.0 mole) of 4-pentene-1-ol and 54.6 g. (0.4 mole) of zinc chloride in 30 cc. of chloroform are reacted in the same manner as in the Example 2. After working up and recrystallization in the same manner as in the Example 2, 36.8 g. of 4,5-di(4'-pentenyloxy)-2-imidazolidinone is obtained. Yield 72.5% of theoretical. The compound has M.P. 68–70° C.

Elementary analysis:

|  | C | H | N |
|---|---|---|---|
| Found | 61.25 | 8.81 | 11.07 |
| Calcd. (for $C_{13}H_{22}O_3N_2$) | 61.37 | 8.73 | 11.01 |

Example 4

23.6 g. (0.2 mole) of 4,5-dihydroxy-2-imidazolidinone, 100 g. (1.0 mole) of 4-hexene-1-ol and 54.6 g. (0.4 mole) of zince chloride in 50 cc. of chloroform are reacted in the same manner as in the Example 2. 36.6 g. of 4,5-di(4'-hexenyloxy)-2-imidazolidinone is obtained. Yield 65.3% of theoretical. The compound has M.P. 109–110° C.

Elementary analysis:

|  | C | H | N |
|---|---|---|---|
| Found | 64.08 | 8.69 | 9.86 |
| Calcd. (for $C_{15}H_{26}O_3N_2$) | 64.24 | 8.64 | 10.00 |

Example 5

23.6 g. (0.2 mole) of 4,5-dihydroxy-2-imidazolidinone, 72.1 g. (1.0 mole) of 3-butene-1-ol and 54.6 g. (0.4 mole) of zinc chloride in 50 cc. of chloroform are reacted in the same manner as in the Example 2. 29.8 g. of 4,5-di(3'-butenyloxy)-2-imidazolidinone is obtained. Yield 65.9% of theoretical.

Elementary analysis:

|  | C | H | N |
|---|---|---|---|
| Found | 58.12 | 7.96 | 12.26 |
| Calcd. (for $C_{11}H_{18}O_3N_2$) | 58.39 | 8.02 | 12.38 |

Example 6

23.6 g. (0.2 mole) of 4,5-dihydroxy-2-imidazolidinone, 86.1 g. (1.0 mole) of 3-pentene-1-ol and 54.6 g. (0.4 mole) of zinc chloride in 50 cc. of chloroform are reacted in the same manner as in the Example 2. 34.5 g. of 4,5-di(3'-pentenyloxy)-2-imidazolidinone is obtained. Yield 67.9% of theoretical. The compound has M.P. 136–138° C.

Elementary analysis:

|  | C | H | N |
|---|---|---|---|
| Found | 61.23 | 8.61 | 11.10 |
| Calcd. (for $C_{13}H_{22}O_3N_2$) | 61.37 | 8.73 | 11.01 |

Example 7

23.6 g. (0.2 mole) of 4,5-dihydroxy-2-imidazolidinone, 72.1 g. (1.0 mole) of crotyl alcohol and 30 g. (0.188 mole) of anhydrous cupric sulfate in 100 cc. of chloroform are warmed at 65–70° C. for 4–6 hours.

After cooling, 300 cc. of chloroform is added to the reaction mixture and undissolved cupric sulfate is filtered off. The filtrate is washed with water and then distilled to remove the solvent. By recrystallizing the residue from acetone, 29.8 g. of 4,5-dicrotyloxy-2-imidazolidinone is obtained. Yield 65.9% of theory.

Example 8

23.6 g. (0.2 mole) of 4,5-dihydroxy-2-imidazolidinone, 72.1 g. (1.0 mole) of crotyl alcohol and 20 g. (0.166 mole) of anhydrous magnesium sulfate in 100 cc. of chloroform are warmed at 65–70° C. for 3–5 hrs.

After working up and recrystallization in the same manner as in the Example 7, 28.3 g. of 4,5-dicrotyloxy-2-imidazolidinone is obtained. Yield 62.6% of theory.

What we claim is:

1. 4,5-dialkenyloxy-2-imidazolidinone represented by the formula

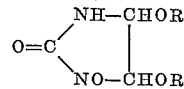

wherein R represents alkenyl of from 3 to 6 carbon atoms.

2. 4,5-dicrotyloxy-2-imidazolidinone.
3. 4,5-di(4'-pentenyloxy)-2-imidazolidinone.
4. 4,5-diallyloxy-2-imidazolidinone.
5. 4,5-di(4'-hexenyloxy)-2-imidazolidinone.
6. 4,5-di(3'-butenyloxy)-2-imidazolidinone.
7. 4,5-di(3'-pentenyloxy)-2-imidazolidinone.
8. A method of preparing 4,5-dialkenyloxy-2-imidazolidinone, represented by the formula

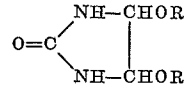

wherein R represents alkenyl of from 3 to 6 carbon atoms which comprises heating 4,5-dihydroxy-2-imidazolidinone with an unsaturated aliphatic alcohol represented by the formula ROH, wherein R is same as above, in the presence of a solid dehydrating agent selected from the group consisting of zinc chloride, anhydrous copper sulfate, and anhydrous magnesium sulfate.

9. A method according to the claim 8, wherein the amount of the unsaturated aliphatic alcohol used is 2 to 10 moles per mole of 4,5-dihydroxy-2-imidazolidinone.

References Cited by the Examiner

UNITED STATES PATENTS

| 2,373,136 | 4/45 | Hoover et al. | 260—309 |
| 3,029,163 | 4/62 | Seki et al. | 260—309 |

FOREIGN PATENTS 838,007   6/60   Great Britain.

IRVING MARCUS, *Primary Examiner.*

DUVAL T. McCUTCHEN, WALTER A. MODANCE,
*Examiners.*